(12) United States Patent
Meedinti Bhaskara Reddy et al.

(10) Patent No.: US 12,229,166 B2
(45) Date of Patent: Feb. 18, 2025

(54) SELF-ORGANIZATION OF DATA STORAGE

(71) Applicant: Bank of America Corporation, Charlotte, NC (US)

(72) Inventors: Harinath Meedinti Bhaskara Reddy, Charlotte, NC (US); Manu Kurian, Dallas, TX (US); Jayachandra Varma, Irvington, TX (US); Erica Perkins, Charlotte, NC (US); Aeric Solow, Richardson, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/205,646

(22) Filed: Jun. 5, 2023

(65) Prior Publication Data
US 2024/0403326 A1 Dec. 5, 2024

(51) Int. Cl.
*G06F 16/28* (2019.01)
(52) U.S. Cl.
CPC .................................. *G06F 16/285* (2019.01)
(58) Field of Classification Search
CPC ...... G06F 16/14; G06F 16/164; G06F 16/215; G06F 16/22; G06F 16/2365; G06F 16/285; G06F 16/289; G06F 16/907; G06F 11/1435; G06F 11/3034; G06F 3/0649; G06F 16/908; G06F 16/909
See application file for complete search history.

(56) References Cited

U.S. PATENT DOCUMENTS

| | | | |
|---|---|---|---|
| 8,489,578 B2 * | 7/2013 | Bhagwan | G06F 16/285 707/710 |
| 9,912,752 B1 * | 3/2018 | Davis | G06F 16/2365 |
| 11,170,424 B1 * | 11/2021 | Lee | G06F 16/9532 |
| 2020/0241967 A1 * | 7/2020 | Dain | G06F 11/0793 |
| 2021/0034948 A1 * | 2/2021 | Souza | G06F 16/24573 |
| 2021/0248145 A1 * | 8/2021 | Parker | G06F 16/9024 |
| 2021/0279217 A1 * | 9/2021 | Senthilnathan | G06F 16/22 |
| 2021/0357804 A1 * | 11/2021 | Lopez | G06N 20/00 |
| 2024/0098617 A1 * | 3/2024 | Ong | H04W 74/0808 |

* cited by examiner

*Primary Examiner* — Robert W Beausoliel, Jr.
*Assistant Examiner* — Cheryl M Shechtman
(74) *Attorney, Agent, or Firm* — Weiss & Arons LLP

(57) ABSTRACT

Provided herein is a method of storing an incoming dataset in a data mesh. The method may include a plurality of steps. The steps may include associating a metadata tag with a classifying feature and a storage instruction in a (first) relational database. The steps may include scanning incoming datasets to identify datasets characterized by the classifying feature. The steps may include tagging an incoming dataset to generate a tagged dataset. The steps may include storing the tagged dataset in the data mesh, according to the storage instruction. The steps may include associating, in a second relational database, the metadata tag with the initial storage location. The steps may include modifying the storage instruction. The steps may include storing the incoming dataset an additional time in the data mesh, according to the modified storage instruction.

18 Claims, 8 Drawing Sheets

SELF-ORGANIZATION OF DATA STORAGE

FIELD OF TECHNOLOGY

Aspects of the disclosure relate to methods of storage and organization of datasets in a system such as a data mesh.

BACKGROUND OF THE DISCLOSURE

Metadata tags are being used, for example, to enable various data manipulation activities, such as data storage and data transfers within networks. Some networks are organized in a distributed data mesh architecture. Different parts of a data mesh may have varying requirements for data storage, for example, based on varying business considerations or security or legal requirements in different jurisdictions.

However, generating and optimizing metadata tags and storage parameters for recently received data sets can be a rate-limiting step, particularly for large institutions, for example internet service providers and search engines and financial institutions. Such institutions are required to process and integrate vast quantities of data on an ongoing basis.

Therefore, there exists a need for improved methods for tagging and storing incoming datasets, if possible in an automated fashion.

SUMMARY OF THE DISCLOSURE

It is an object of this invention to improve data tagging and storage, e.g., in a distributed datastore.

It is a further object of this invention to automate tagging and storage of datasets newly received by a data mesh or network.

It is a further object of this invention to automatically adapt newly received datasets to various components of a data mesh, the various components having different data storage or access requirements.

It is a further object of this invention to automatically readapt existing datasets to changing storage and access requirements of a data mesh of components thereof.

Many datasets in computer systems in use today include metadata. For the purposes of this application, metadata may be understood to be data characterizing data. In some embodiments, it may be desirable for the metadata elements to be continually synchronized across a variety of applications.

A method in accordance with principles of the disclosure may be implemented by a computer and/or be automated.

Provided herein is a method of storing an incoming dataset in a data mesh, in accordance with principles of the disclosure. The method may utilize a computer processor and one or more non-transitory computer-readable media storing computer executable instructions. The instructions, when executed by the computer processor, may automatically annotate selected incoming datasets with metadata tags.

The method may include associating a metadata tag with at least one classifying feature and at least one storage instruction in a (first) relational database. The method may also include scanning incoming datasets to identify datasets characterized by the classifying feature. The method may also include upon identifying a dataset containing the classifying feature, generating a tagged dataset by attaching the tag. The method may also include storing the tagged dataset in the data mesh, according to the storage instruction. The method may also include associating, in a second relational database, the metadata tag with the initial storage location. The method may also include modifying the storage instruction. The modifying may be subsequently. The method may also include storing the incoming dataset a second time in the data mesh, according to the modified storage instruction.

The system or network utilized in the described method may be configured to store a metadata tag in association with a classifying feature and a storage instruction in the first relational database.

In some embodiments, the described system or processor is configured to repeat as necessary the steps of receiving a modified storage instruction and storing the incoming dataset additional times in the data mesh, according to the modified storage instruction. For example, these steps may be repeated whenever there is an alteration in the storage instruction(s) associated with the metadata tag in the first relational database.

A method in accordance with principles of the disclosure may utilize a computer processor and one or more non-transitory computer-readable media storing computer executable instructions. The instructions, when executed by the computer processor, may automatically perform various activities, as described herein.

As such, the present disclosure provides a technical solution to a technical problem of automated processing, tagging, and efficient storage of datasets entering a data mesh.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
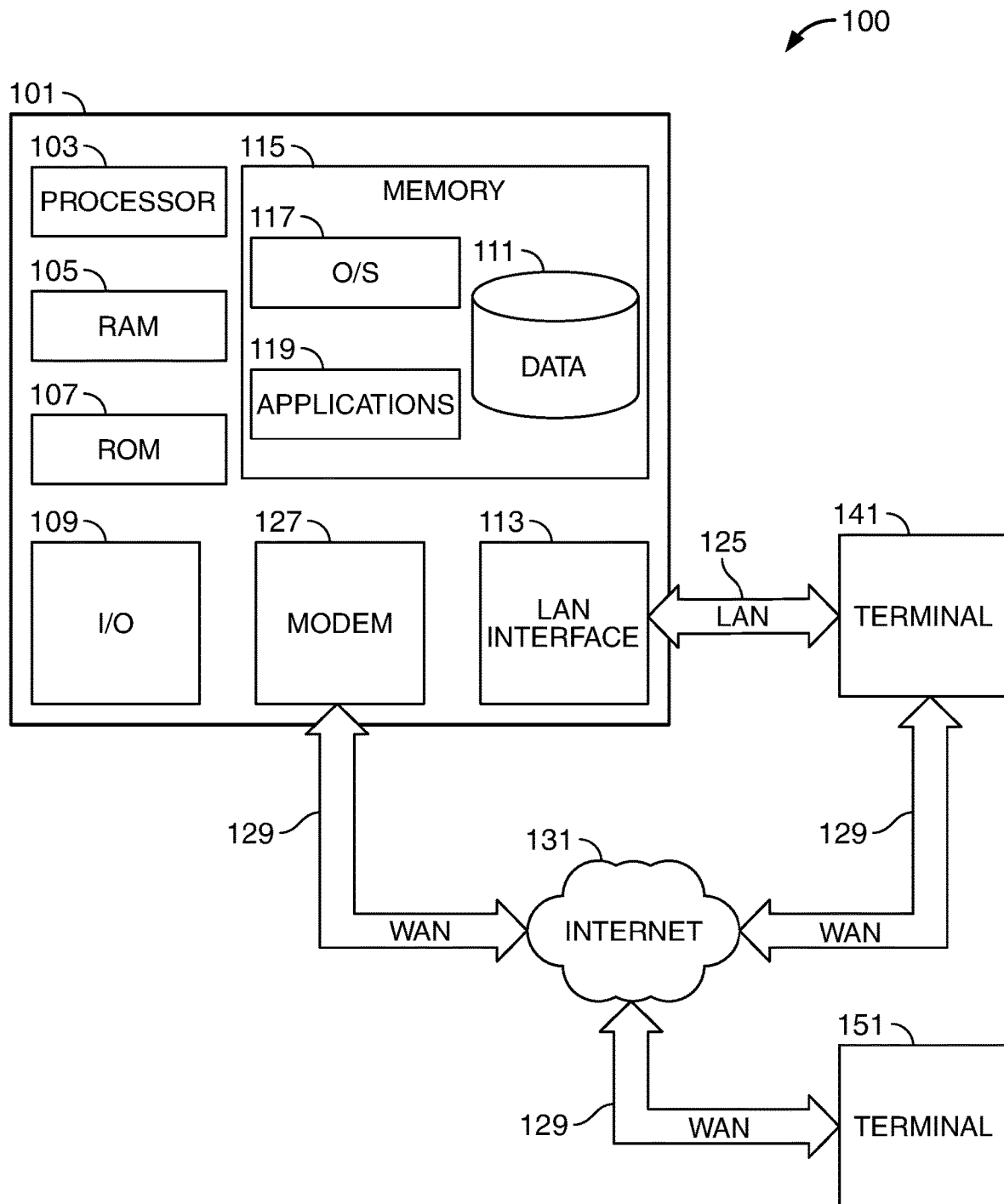
FIG. 1 shows an illustrative system in accordance with principles of the disclosure.

Systems and methods are described for creating self-organizing databases, and/or for utilizing other complex, specific-use computer systems to provide a novel approach for processing incoming datasets in a data mesh and improve use of computer resources such as database working memory and storage space.

A method in accordance with principles of the disclosure may be implemented by a computer and/or be automated.

Provided herein is a method of storing an incoming dataset in a data mesh, in accordance with principles of the disclosure. The method may utilize a computer processor and one or more non-transitory computer-readable media storing computer executable instructions. The instructions, when executed by the computer processor, may automatically annotate store incoming datasets with metadata tags, according to storage instructions saved in the mesh.

The method may include associating a metadata tag with at least one classifying feature and at least one storage instruction in a (first) relational database. The method may include scanning incoming datasets to identify datasets characterized by (or including) the classifying feature. The method may also include upon identifying a dataset containing the classifying feature, generating a tagged dataset. The method may also include storing the tagged dataset in the data mesh, according to the storage instruction. The method may also include associating, in a second relational database, the metadata tag with the initial storage location. The method may also include modifying the storage instruction. The method may also include storing the incoming dataset a second time in the data mesh, according to the modified storage instruction.

In other embodiments, there is provided a processor configured to perform the aforementioned steps, in accordance with principles of the disclosure. In certain embodiments, the processor is associated with the described data mesh.

In other embodiments, there is provided a system configured to perform the aforementioned steps, in accordance with principles of the disclosure. In certain embodiments, the system includes a processor and a data mesh.

The system or network utilized in the described method may be configured to store a metadata tag in association with a classifying feature and a storage instruction in the first relational database. A processor may perform these steps.

The described classifying feature may be a feature of the dataset, for example the content of the dataset. The feature may include the presence of one or more data fields in the dataset, for example the name, telephone number, or address of a customer or other entity; or identifying information such as social security number, driver's license number, passport number, or another government-issued identification number. Other data fields that could be a classifying feature include account information about the customer or entity, for example account information, e.g., account number, account balance, and account status.

In other embodiments, the classifying feature is the data lifetime.

Other possible classifying features include the geographic origin of the data, the size of the dataset, and the storage destination within the data mesh or network.

In certain embodiments, the classifying feature is a feature expected to be encountered in at least some future datasets encountered by, or absorbed by, the described data mesh.

The term incoming dataset may refer, in some embodiments, to a dataset that is encountered by the data mesh (or by the system) for the first time. In other embodiments, the term refers to a database that is stored in the mesh's working memory for the first time. In other embodiments, the database is processed by the mesh for the first time.

The described storage instruction may be, for example, selected from a specified storage format and a specified location. In some embodiments, the storage instructions are configured to be automatically read and implemented by a processor.

Specified storage formats are known in the art. Such formats may include, without limitation, file storage, block storage, and object storage. Other storage formats may include data lifetime, e.g., the time after which the dataset, or a specified data field of the dataset, is automatically deleted; and data accessibility, e.g., the ability of the data to be accessed or opened by a human user of the system. In certain embodiments, the dataset is automatically routed to a storage area that supports the specified storage format.

The storage instruction may also be a specified location in the mesh, in which to store the data. For example, the location may be a type of storage space, for example a file storage space, a block storage space, or an object storage space. The specified location may be a geographical location in the mesh in which the storage space is housed. In other embodiments, the specified location is a data mesh location associated with a particular time frame, for example short-term storage space, medium-term storage space, or long-term storage space.

A processor in the described system or network may be configured to, upon receipt of a dataset in the data mesh (for example, in the memory or a temporary storage location in the data mesh), ascertain whether the incoming dataset comprises the classifying feature. In some embodiments, embodiments, the step of ascertaining is automatically performed. In other embodiments, the step of ascertaining is performed by a human user of the system.

Once it is ascertained that the incoming dataset comprises the classifying feature, the following steps may be performed, in some embodiments automatically by a processor. The steps may include the metadata tag and the storage instruction associated with the classifying feature in the first relational database may be automatically retrieved or obtained. The classifying feature may be automatically retrieved or obtained from the first relational database. The steps may include the incoming dataset may be automatically annotated with the metadata tag. At this step, a tagged dataset may be generated. The steps may also include the tagged dataset may be automatically stored in an (initial) storage location in the data mesh. Such a process may be directed by the storage instruction in the first relational database. The steps may also include the metadata tag may be automatically associated with the initial storage location, in a second relational database.

In some embodiments of the described methods and systems, the metadata tag(s) is/are, in each instance, automatically read by a processor. In other embodiments, the tag(s) is/are read by an automated tag reader, or by a DataReader or data reading apparatus.

As mentioned, the storage instruction stored in association with the metadata tag in the first relational database may be subsequently modified. This may generate a modified storage instruction. This may be done for a variety of reasons, non-limiting examples of which are mentioned herein. A processor associated with the data mesh may then receive an indication of a change in the storage requirement and automatically perform or direct the subsequent method steps. The storage requirement may be altered, in some embodiments, for the entire data mesh. In other embodiments, the storage requirement is altered for certain regions, e.g., geographic regions, of the data mesh.

In some embodiments of the described methods and systems, a processor or tag reader associated with the data mesh is loaded with the instructions for storage of datasets containing each metadata tag, as specified in the second relational database. In certain embodiments, the processor or tag reader is configured to be automatically reprogrammable, whenever storage instructions for a given tag are altered.

"Indication" of a change in the storage requirement is intended to encompass a notification of any form, via a computerized information medium and capable of conveying the modification in the storage requirement. Such indications may be machine/automatically generated or, in other embodiments, generated by a human user.

As mentioned, upon generation of the modified storage instruction, the incoming dataset is then stored an additional time in the data mesh. This process may be directed by the modified storage instruction. A processor may be configured to retrieve the tagged dataset and implement the modified storage instruction.

The second/additional storage step may be, in different embodiments, disposed in the same location or a different location as the initial storage. In certain embodiments, the second/additional storage is in the same or a different storage format than the initial storage. In other embodiments, the second/additional storage differs from the initial storage in at least one of the storage location and the storage format.

The copy stored according to the modified storage instruction may be an additional copy that co-exists with the initial copy, or it may replace the initial copy.

In some embodiments, the described system or processor is configured to repeat as necessary the steps of receiving a modified storage instruction and storing the incoming dataset an additional time in the data mesh, according to the modified storage instruction. For example, these steps may be repeated for each instance of an alteration in the storage instruction(s) associated with the metadata tag (e.g., the instructions stored in the first relational database).

In various embodiments, any of the steps mentioned herein may be automated. In certain embodiments, all the steps of a described method are automated. In other embodiments, all the steps are automated except for the steps of associating a metadata tag with a classifying feature and a storage instruction in a relational database; and modifying the storage instruction. In other embodiments, all the steps are automated except for the step of associating a metadata tag with a classifying feature and a storage instruction in a relational database. In other embodiments, all the steps are automated except for the step of modifying the storage instruction.

In certain embodiments, the described methods further include the step of automatically mapping the first and second storage locations. In other embodiments, all subsequent locations are also automatically mapped. In some embodiments, the step of mapping enables subsequent automatic retrieval of the datasets with a given metadata tag, e.g., for purposes of implementing an altered storage instruction for datasets annotated with that tag. In other embodiments, the step of mapping enables subsequent automatic retrieval of all copies of a given dataset.

The metadata contained in the tag is, in some embodiments, descriptive metadata. In other embodiments, the metadata is structural metadata. In other embodiments, the metadata is administrative metadata. In other embodiments, the metadata is reference metadata. In other embodiments, the metadata is selected from the group consisting of descriptive, structural, administrative, and reference metadata.

In some embodiments of the described methods and systems, the modified storage instruction includes an instruction to store the incoming dataset in the data mesh in a second storage location that differs from the initial storage location. In some embodiments, an additional copy of the dataset is stored in the second location. In other embodiments, the dataset is erased from the initial storage location and saved instead in the second location. In further embodiments, the method further comprises the step of automatically associating, in the second relational database, the metadata tag with the second storage location. In other embodiments, the metadata tag is associated in the database with all locations of datasets annotated with the tag.

With further reference to storage in a second storage location, as specified by the modified storage instruction, the initial and second storage locations may have, in some embodiments, different requirements for data storage. These requirements may be dictated by, for example, business considerations, security considerations, or privacy laws. Storage in a particular jurisdiction may be, for example, more expensive than in a different jurisdiction. Certain jurisdictions may not require storage of certain data fields. In other jurisdictions, privacy laws or security considerations may make it impractical to store certain data fields containing identifying information about customers or other entities. For purposes of exemplification, a particular jurisdiction may require backup storage of certain data fields that is not required in a different jurisdiction.

In certain embodiments of the described methods and systems, data is modeled and/or trained in a manner that aligns with the local laws and regulations. A business rules engine may be configured to automatically alter the data modeling and/or training algorithms for a particular jurisdiction, when the laws or regulations change.

In some embodiments, the modified storage instruction may be necessitated by, or may reflect, constraints of the second storage location that do not exist for the initial storage location. For example, it may be, or become, necessary to store an additional copy of a dataset in a second jurisdiction, in which certain identifying information, for example customer names and phone numbers, is not allowed to be accessible to a human operator or user. In other embodiments, identifying information may only be allowed to be stored in the second jurisdiction for a finite amount of time, for example 7, 10, 20, or 30 days.

In other embodiments, the modified storage instruction may be enabled by, or may reflect, the second storage location not being subject to constraints that exist for the initial storage location. For example, the second storage location may not have data storage lifetime limits that exist in the first storage location, for example for certain data fields, such as identifying information.

In further embodiments, indication of a limited storage lifespan of a particular data field automatically triggers a modified storage instruction, specifying storage of an additional copy of a dataset in another jurisdiction. In other embodiments, one or more data fields are indicated as having a limited storage lifespan. Such notification may automatically trigger a modified storage instruction.

In other embodiments, receipt of a dataset in a second jurisdiction, having different storage requirements than another jurisdiction in which the dataset is already stored, automatically triggers generation of the modified storage instruction. In other embodiments, receipt of the database in a (sub) network or regional data mesh associated with the second jurisdiction triggers the modified storage instruction. In still other embodiments, the second storage location is housed in the second jurisdiction, for example a component of a global data mesh, the component being housed in the jurisdiction. Regional data mesh, in certain embodiments, may refer to a data mesh associated with a particular jurisdiction. In certain embodiments, the regional data mesh is configured to store data from the jurisdiction. In still other embodiments, the regional data mesh is physically located in the jurisdiction. Receipt of a dataset by a subnetwork or regional data mesh may refer, in some embodiments, to the subnetwork or data mesh encountering the dataset for the first time. In other embodiments, the term may refer to processing of the dataset for the first time.

In an exemplary method (e.g., see FIG. 7), a regional (or local, or area) data mesh (RDM) in Jurisdiction A (JA) (RDM-JA) receives a copy of a dataset, and a processor in JA identifies the dataset as having the classifying feature. Next, the JA-based processor obtains from a first relational database (RD1) the metadata tag and storage instruction associated with the classifying feature. The JA-based processor next tags the dataset and stores it in RDM-JA. The processor also stores, in a second relational database (RD2), a pointer to the storage area in RDM-JA, in association with the metadata tag.

Subsequently, the tagged dataset may be received in a second regional data mesh (RDM) in Jurisdiction B (JB) (RDM-JB). The additional or modified storage instruction may be stored in an additional row of RD1. This step may be performed by the JB processor. Association of an additional or modified storage instruction with the metadata tag may be automatically triggered by receipt of the tagged dataset in RDM-JB.

In some embodiments of the described methods and systems, the instruction(s) for storage in the second jurisdiction are in place prior to initial receipt of the dataset in the first jurisdiction. The system is thus, in some embodiments, configured to store different copies of an incoming dataset in different jurisdictions. This could be in cases where the dataset originated in the first jurisdiction and is initially stored there. Upon receipt of the dataset for processing in a computer, network, or regional data mesh associated with the second jurisdiction, storage in the second jurisdiction, according to the modified storage instructions, is automatically triggered.

In some embodiments, the modified storage instruction may include an instruction to deny user accessibility of at least one data field in the second storage location, for example in cases where the data field is user accessible in the initial storage location. In other embodiments, the modified storage instruction includes making user-accessible at least one data field in the second storage location, for example where the data field is not accessible in the initial storage location. User accessibility, in this context, may relate to the ability of a human user of the system to view or access the relevant data field. In certain embodiments, selected data fields may be hidden, or masked, from human users of the system, such that the system does not even reveal the existence of data points populating the data field. In other embodiments, access to the data fields is restricted from human access, unless special permission is obtained. Such an instruction to deny or allow human access to the described data fields need not constitute the entire storage instruction.

The described storage instruction is, in some embodiments, derived from a storage instruction associated with an existing dataset already stored in the data mesh and annotated with the same metadata tag or set of tags. Alternatively, or in addition, the prior dataset has the same classifying feature as the incoming dataset. Derived from, in this context, may refer to copying the storage instruction from the prior storage instruction. In other embodiments, the prior storage instruction is used as a starting point to generate a storage instruction suited to, or optimized for, the incoming dataset. In some embodiments, a processor is configured to automatically use metadata tag to identify a prior dataset in the data mesh that has the classifying feature. In still other embodiments, a processor is configured to automatically identify a dataset already saved in the mesh that is believed to be the closest match to the incoming dataset, or a match deemed sufficiently close according to predetermined criteria. The degree of match may be evaluated on the basis of file contents, dataset size, or other parameters deemed useful by the organization managing (or owning) the data mesh. The mentioned processor may be, in various embodiments, the same or a different processor as the processors mentioned hereinabove.

In some embodiments, the storage instructions for the incoming dataset are honed and/or optimized by a tunable storage rule engine. In certain embodiments, a machine learning or artificial intelligence algorithm is utilized. (See FIG. 8 for an exemplary, non-limiting protocol).

In other embodiments, the aforementioned step of tagging the incoming dataset utilizes tagging rules derived from a prior dataset. In some embodiments, the tagging rules for the incoming dataset are honed and/or optimized by a tunable tagging rule engine. In certain embodiments, a machine learning or artificial intelligence algorithm is utilized.

The described step of further storing the incoming dataset (according to the modified storage instruction) may utilize, in some embodiments, a data link between the first and second storage locations. In further embodiments, the method may further include the step of automatically gatekeeping data transfers along the data link. The gatekeeping step may be performed by the described processor, or by another processor associated with the data mesh. Gatekeeping may, in some embodiments, encompass regulating data traffic only the data link. The permissible volume of data transferred along the link for a particular dataset is, in some embodiments, specified by the metadata tags on the dataset.

The mentioned data link, in some embodiments, connects the first and second storage locations such that digital information (e.g., data communication) can be transmitted and received. In certain embodiments, the data link is an assembly of electronic components, including a transmitter, a receiver, and interconnecting data telecommunication circuit. In certain embodiments, the data link is governed by a link protocol enabling digital data to be transferred from a data source to a data sink.

In some embodiments, the aforementioned method steps are repeated a plurality of times, for example at least 2 times, at least 3 times, at least 5 times, at least 10 times, at least 20 times, or at least 100 times. In certain embodiments, a processor associated with the described data mesh is configured to repeat the method steps whenever storage instructions are modified. In some embodiments, the repeated steps include (i) modifying the storage instruction; and (ii) automatically storing the incoming dataset according to the presently modified storage instruction. In certain embodiments, the described system or processor is configured to repeat the aforementioned steps (i-ii), indefinitely or until reprogrammed otherwise.

The described metadata tag is, in some embodiments, in binary format. In other embodiments, the tag is in text format. Binary metadata is, in some embodiments, more amenable to automated processing.

In certain embodiments, the described methods further include the step of identifying redundant copies of the dataset in the data mesh. In certain embodiments, the described systems are configured to identify redundant copies of the dataset in the data mesh. In certain embodiments, the identification utilizes the described metadata tags. In some embodiments, the methods further include the step of deleting the redundant copies of the dataset. In some embodiments, the deletion follows the step of identifying redundant copies, via the metadata tags.

In certain embodiments of the described methods and systems, existing datasets in the data mesh are also tagged according to the described methods. Such tagging is useful, in some embodiments, for future storage and processing of the existing datasets.

As will be appreciated by those skilled in the art, the term "initial[ly]", in reference to the tagging or storage of a dataset, do not exclude instances in which the incoming dataset already contains metadata tag(s). Rather, the reference indicates that the dataset is tagged or stored (as appropriate) for the first time during the described method, or for the first time by the described system.

In some embodiments, the aforementioned processing device or computer processor may be a computer, as described in more detail in FIG. 1, optionally including any of the components and elements described for FIG. 1.

Figure 2:
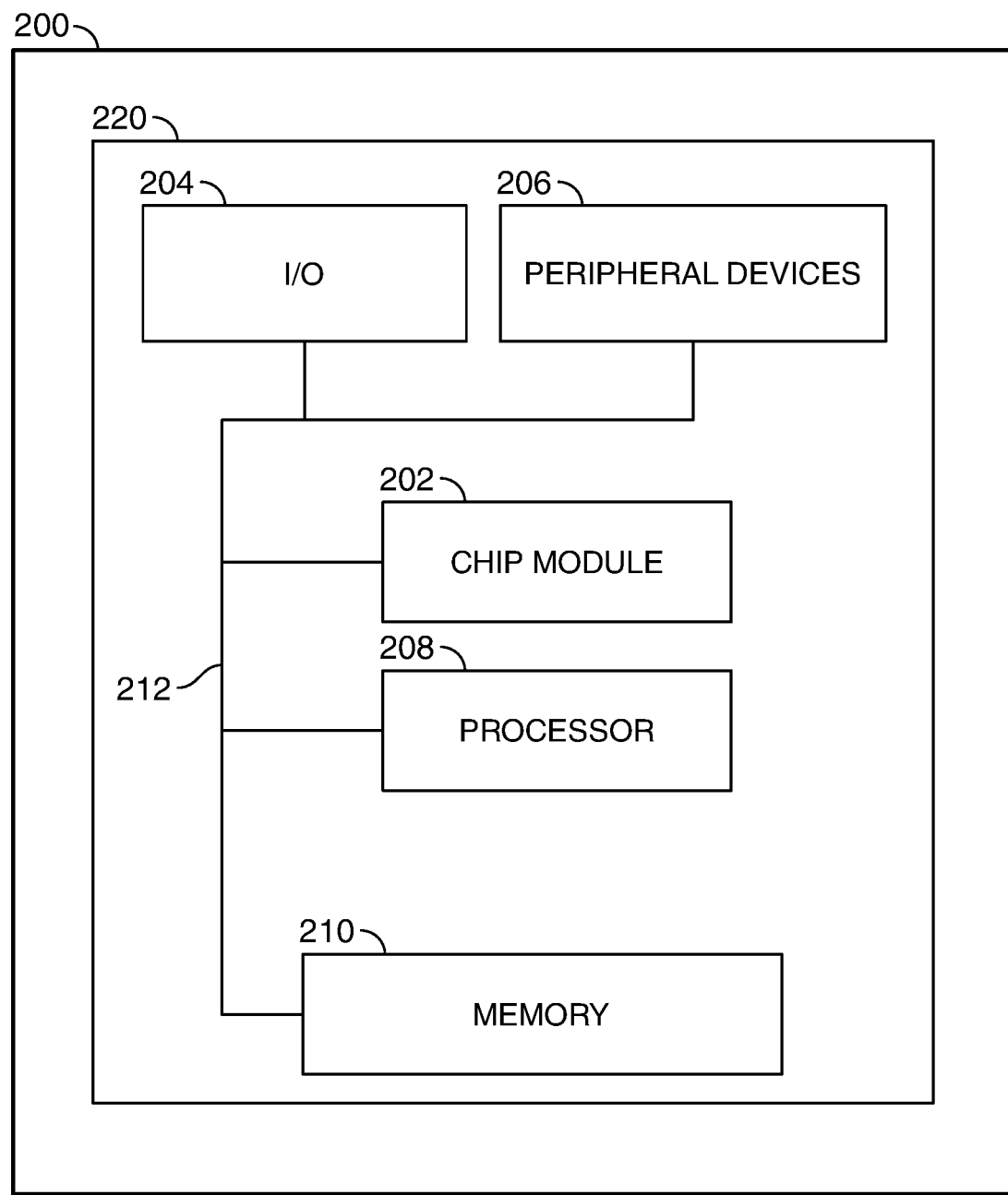
FIG. 2 shows an illustrative system in accordance with principles of the disclosure.

In some embodiments, the processing device or computer processor may be a computer, as described in more detail in FIG. 2, optionally including any of the components and elements described for FIG. 2.

The described methods and systems may include structuring data stored in data storage units across a network and/or a data mesh to expedite access to structured data. The method may include operating a data ingestion engine to process incoming datasets and implement AI/ML systems. The data ingestion engine may communicate with data storage units or silos located in a network. The data ingestion engine may communicate with data storage units or silos located in a data mesh. The data ingestion engine may implement a machine learning system to categorize and layer data within data storage units according to data structure level. The machine learning system may tokenize or encrypt the data in the data storage units by creating a token or key in the metadata of the data that corresponds to the structure of the data. The data ingestion engine may receive a user token or key from a user of a user unit. The data ingestion engine may receive a device token or key from a device of a user device. The data ingestion engine may receive a user token or key and a device token or key from a user device.

The described methods and systems may include the step of the data ingestion engine implementing a machine learning system to optimize the former's structuring of a data storage unit. The data ingestion engine may provide the user token or key. The data ingestion engine may provide the device token or key. The data ingestion engine may provide both the user token or key and the device token or key. The data ingestion engine may present these tokens or keys to a controller positioned between the data ingestion engine and a data storage unit. After receiving the tokens or keys, the controller may communicate with the data storage unit to wake the latter up from a dormant state. The controller may communicate by way of a backchannel to the data storage unit. The data ingestion engine may receive approval from the controller to access the data storage unit. The data ingestion engine may then communicate directly with the data storage unit. The data ingestion engine may communicate with the data storage unit through the controller. The data ingestion engine may provide the user token or key, the device token or key, or both the user token or key and device token or key directly to the data storage unit. The data ingestion engine may then retrieve data according to the level of data structure. The level of structure may be a function of rules given in the data structure map. The level of structure may be a function of which data is accessible with the user token or key and the device token or key, or both the user and device tokens or keys. The data ingestion engine may provide the retrieved data to the user device.

Apparatuses and methods described herein are illustrative. Apparatuses and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatuses may omit features shown or described in connection with illustrative apparatuses. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative, and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. Such programs may be considered, for the purposes of this application, to be engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
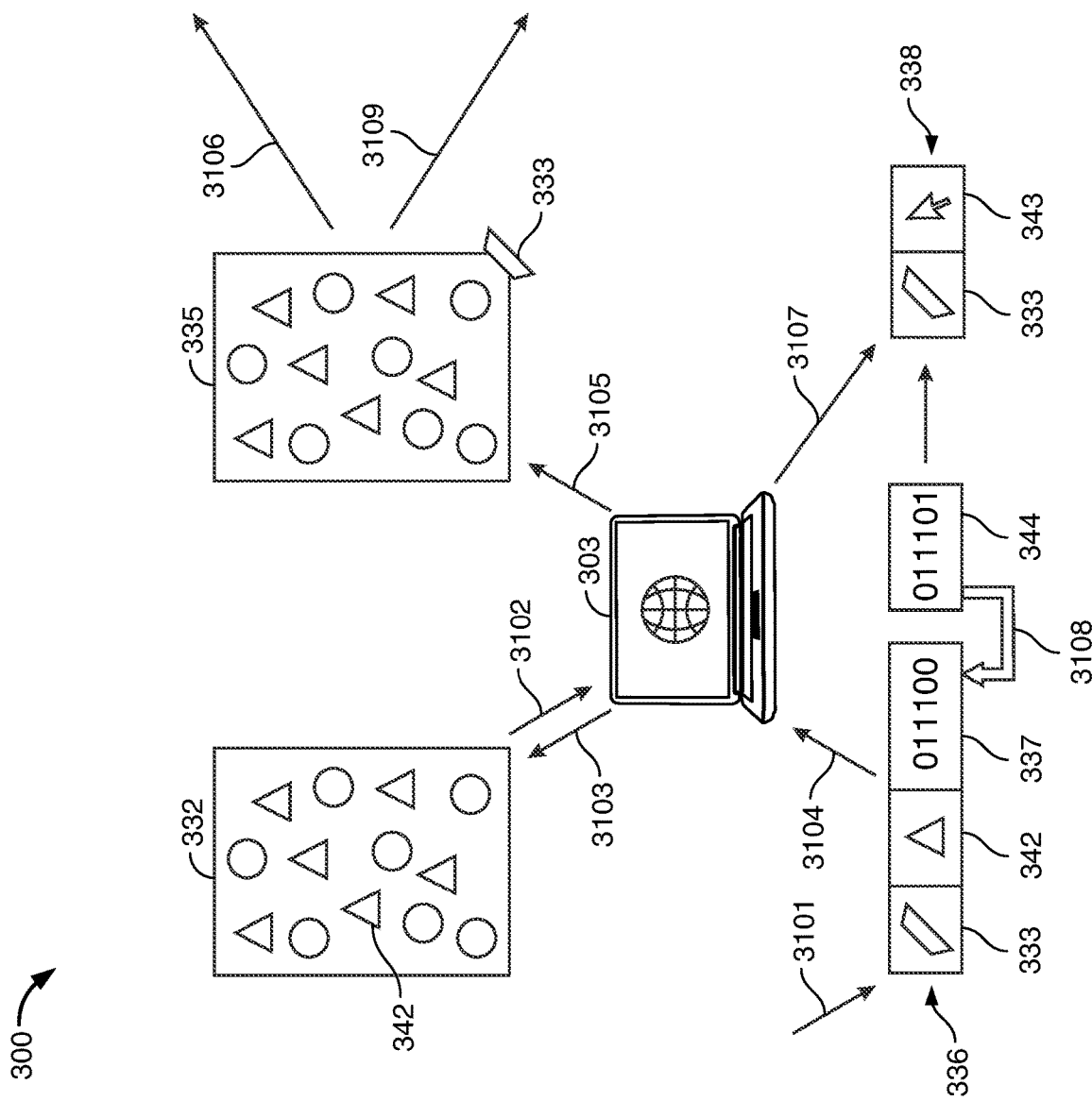
FIG. 3 is a schematic diagram depicting a method of storing an incoming dataset in a data mesh, in accordance with principles of the disclosure.

FIG. 3 is a schematic diagram depicting a method 300 of storing an incoming dataset 332 in a data mesh 340, in accordance with principles of the disclosure. As illustrated in FIG. 3, metadata tag 333 is saved in association with classifying feature 342 and storage instruction 337, in first relational database 336 (arrow 3101). Incoming dataset 332 is received by network (not depicted) and routed to processor 303 (arrow 3102), which may be a data ingestion engine. Processor 303 automatically ascertains whether incoming dataset 332 is characterized by classifying feature 342 (arrow 3103). If yes, processor 303 accordingly may perform the following steps. The steps may include obtaining the corresponding metadata tag 333 and storage instruction 337 from first relational database 336 (arrow 3104). The steps may include annotating the incoming dataset with the metadata tag to generate tagged dataset 335 (arrow 3105). The steps may include routing and stores the tagged dataset in an initial storage location 334 in data mesh 340, according to storage instruction 337 (routing and storing steps are collectively represented as arrow 3106). The steps may include automatically associating, in a second relational database 338, the metadata tag with a pointer 343 to the initial storage location 334 (arrow 3107).

A processor may be configured to store, in association with the metadata tag, the initial storage location of the database, in the second relational database. In other embodiments, the processor is configured to store all locations of the database in association with the metadata tag in the database. In other embodiments, the processor is configured to store, in association with the metadata tag, all locations of all databases annotated with the tag. Such storage may expedite, in certain embodiments, implementation of altered storage instruction(s) associated with the tag.

Subsequently, storage instruction 337 may be modified to modified storage instruction 344 (arrow 3108). Upon generation of modified storage instruction 344, dataset may then be stored in second storage location 339 in data mesh 340, according to modified storage instruction 344 (arrow 3109). Storage may be in a different storage location (as depicted) or the same storage location.

In some embodiments, all the components may communicate via a network (not depicted). In some embodiments, all the aforementioned steps are performed by processor 303.

Figure 4:
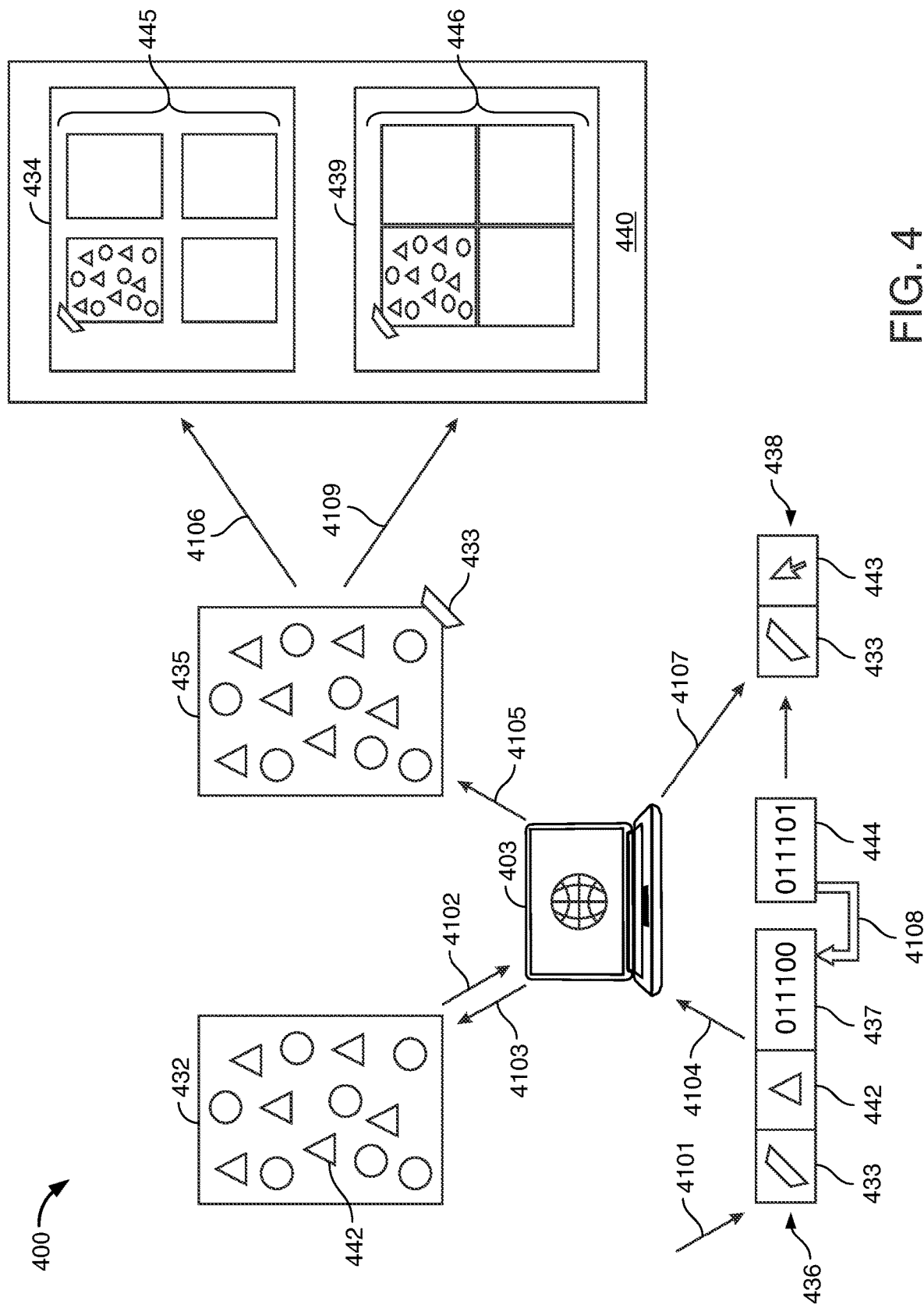
FIG. 4 is a schematic diagram depicting a method of automatically storing an incoming dataset in a data mesh, in accordance with principles of the disclosure.

FIG. 4 is a schematic diagram depicting a method 400 of automatically storing an incoming dataset in a data mesh 440, in accordance with principles of the disclosure. Steps 4101-4108 are similar or identical to steps 3101-3108 of FIG. 3 and are described herein only inasmuch as they differ from steps 3101-3108. In arrow 4106, dataset 435 is saved in initial storage location 434 in data mesh 440 in file storage format (indicated by hierarchal box structure 445). Modified storage instruction 444 stipulates a second storage of the dataset in block storage format (indicated by brick-like structure 446) in second storage location 439. While FIG. 4 indicates that the first and second storage steps differ in both their storage locations and storage formats, either or both parameters may be altered in the described methods and systems.

In some embodiments, all the components may communicate via a network (not depicted). All the aforementioned steps may be performed by processor 403.

Figure 5:
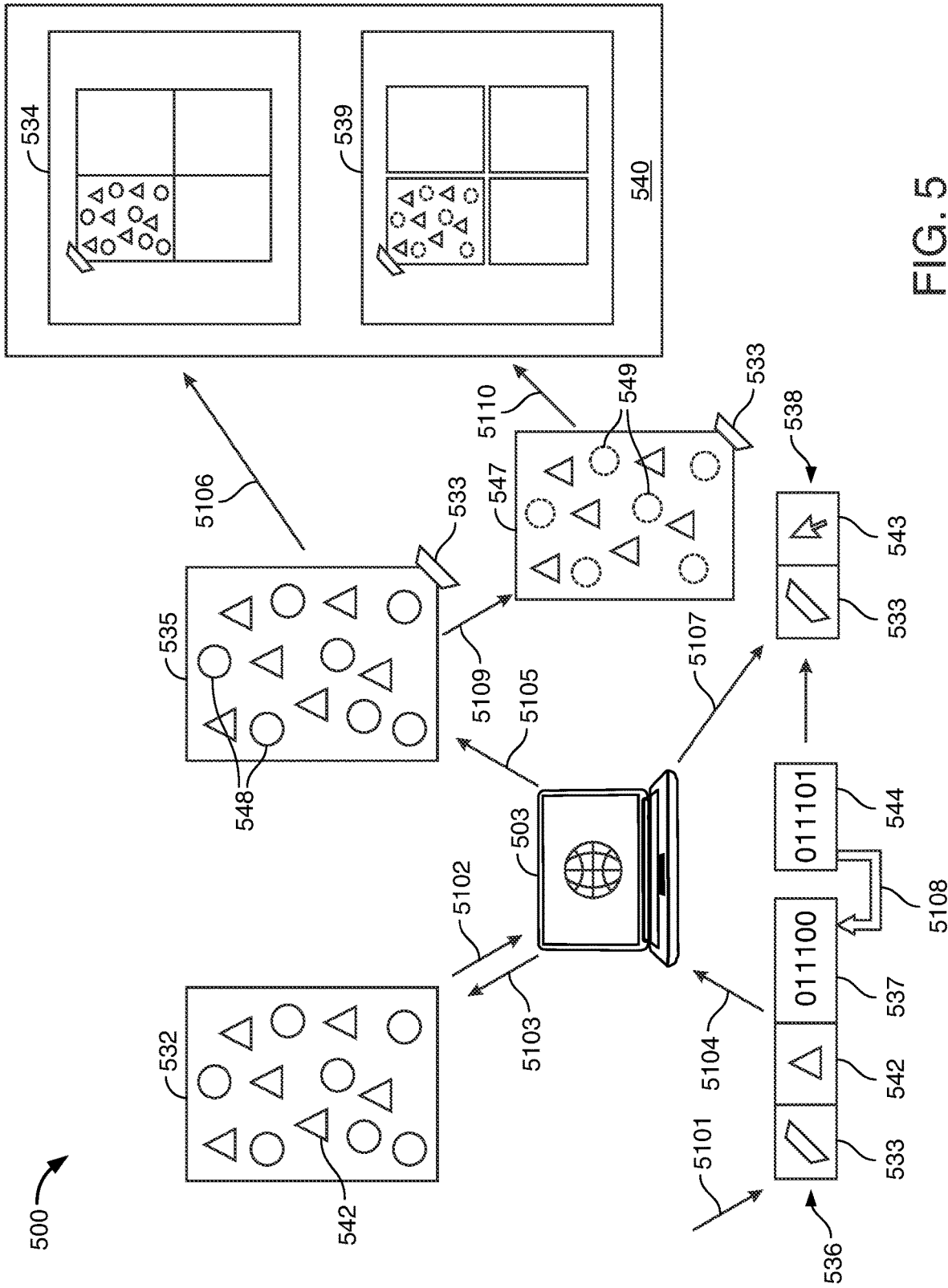
FIG. 5 is a schematic diagram depicting a method of automatically storing an incoming dataset in a data mesh, in accordance with principles of the disclosure.

FIG. 5 is a schematic diagram depicting a method 500 of automatically storing an incoming dataset in a data mesh 540, in accordance with principles of the disclosure. Steps 5101-5108 are similar or identical to steps 3101-3108 of FIG. 3 and are described herein only inasmuch as they differ from steps 3101-3108. Modified storage instruction 544 stipulates a second storage of the dataset in an altered data format (arrow 5109) to generate altered dataset 547, which still retains tag 533. In the depicted embodiment, one or more data points 548, which may be stored in specified data fields, are accessible to a user (not depicted) in (initially) tagged dataset 535, but are hidden from access by a user in altered dataset 547, as depicted by dotted circles 549. Such restricted access of data points is merely one example of alterations in the data format encompassed by the described methods and systems. Processor 503 then routes altered dataset 547 to a storage location 539 of data mesh 540 and stores (routing and storing steps are collectively represented as arrow 5110) dataset. Storage location 539 may be different from (as depicted) or the same as storage location 534. The storage format of the second storing step may be different from or the same as the format of the first storing step.

In some embodiments, all the components may communicate via a network (not depicted). All the aforementioned steps may be performed by processor 503.

Figure 6:
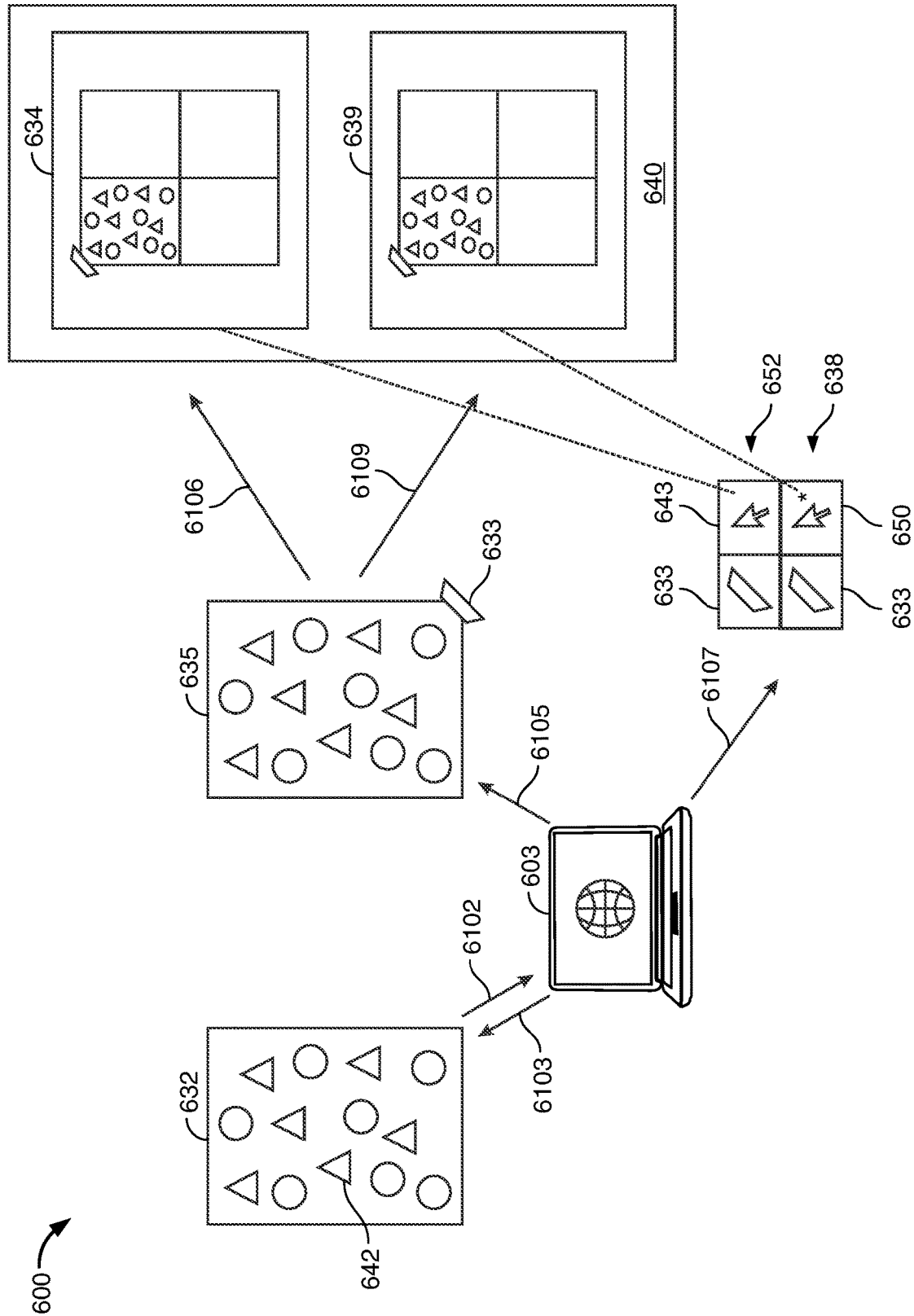
FIG. 6 is a simplified diagram depicting a method of automatically storing an incoming dataset in a data mesh, in accordance with principles of the disclosure.

FIG. 6 is a simplified diagram depicting a method 600 of automatically storing an incoming dataset in a data mesh 640, in accordance with principles of the disclosure. Steps 6101-6109 are similar or identical to steps 3101-3109 of FIG. 3 and are described herein only inasmuch as they differ from steps 3101-3109. Steps 6101-6109 are only partially depicted in FIG. 6, in order to simplify the diagram. In arrow 6110, an additional row 653 of second relational database 638 is automatically created, wherein metadata tag is associated with second pointer 650, which points to second storage location 639. Additional row 653 may be in addition to first row 652 (as depicted), for example in instances where dataset 635 is stored simultaneously in both initial storage location 634 and second storage location 639. In other embodiments, additional row 653 may replace first row 652, for example in instances where dataset 635 is no longer stored in initial storage location 634.

In some embodiments, all the components may communicate via a network (not depicted). All the aforementioned steps may be performed by processor 603.

Figure 7:
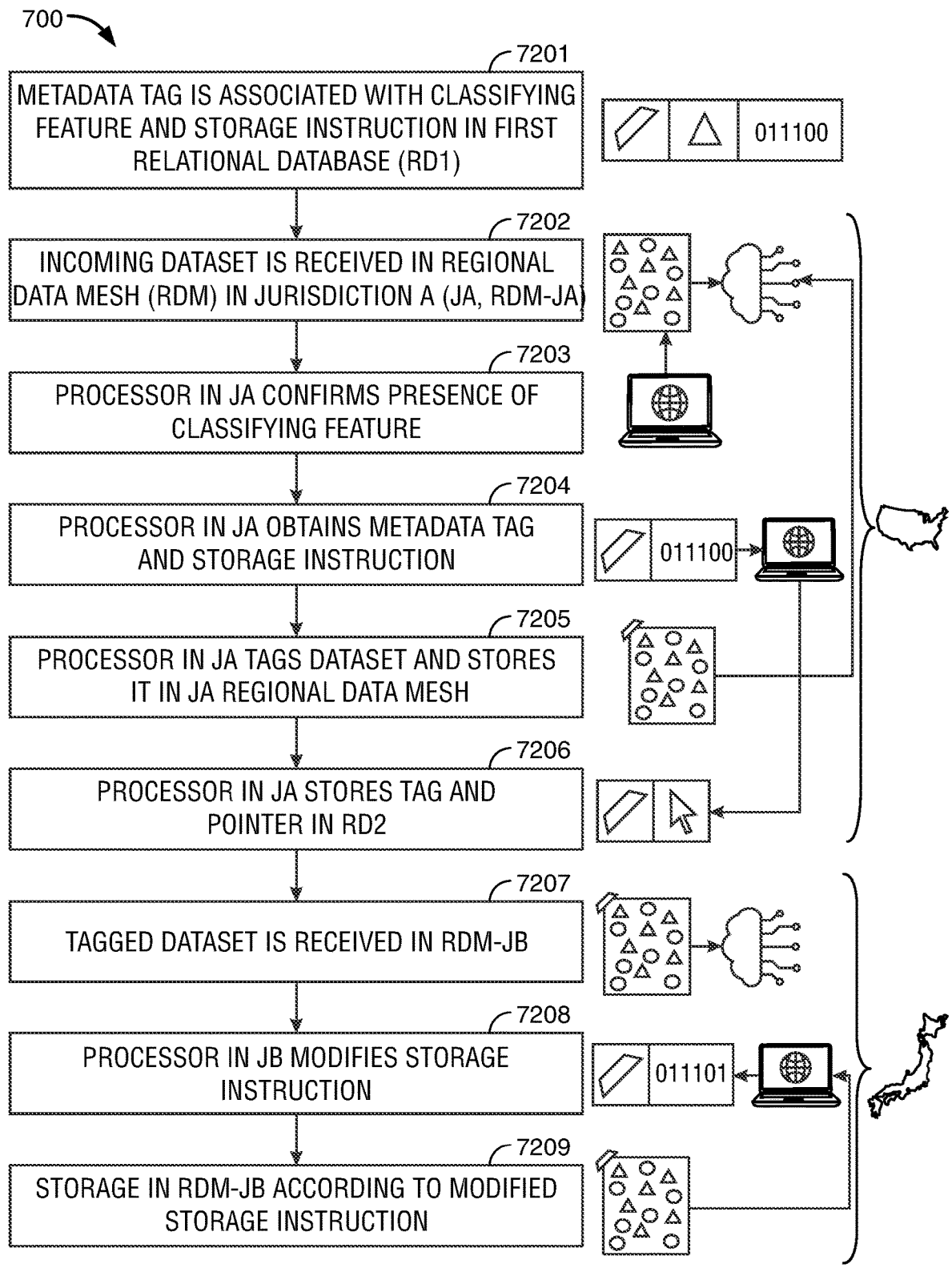
FIG. 7 is a flowchart depicting steps of a method of storing an incoming dataset in a local data mesh in each of multiple jurisdictions, in accordance with principles of the disclosure.

FIG. 7 is a flowchart depicting steps of a method 700 of storing an incoming dataset in a local data mesh in each of multiple jurisdictions, in accordance with principles of the disclosure. In step 7201, a metadata tag is associated with a classifying feature and a storage instruction in first relational database (RD1).

In step 7202, an incoming dataset is received in regional data mesh (RDM) in Jurisdiction A (JA) (RDM-JA).

In step 7203, a processor in JA ascertains the presence of the classifying feature in the incoming dataset. The dataset is found to contain the feature.

In step 7204, the JA processor obtains from RD1 the metadata tag and storage instruction associated with the classifying feature.

In step 7205, the JA processor tags the dataset and stores it in RDM-JA.

In step 7206, the JA processor stores, in RD2, a pointer to the storage area in RDM-JA, in association with the metadata tag.

In step 7207, the tagged dataset is received in regional data mesh (RDM) in Jurisdiction B (JB) (RDM-JB).

In step 7208, an additional or modified storage instruction is associated with the metadata tag in RD1. The additional or modified storage instruction may be stored in an additional row of RD1. This step may be performed by the JB processor. This step may be automatically triggered by receipt of the tagged dataset in RDM-JB.

In step 7209, the dataset is stored in RDM-JB, according to the additional or modified storage instruction.

Figure 8:
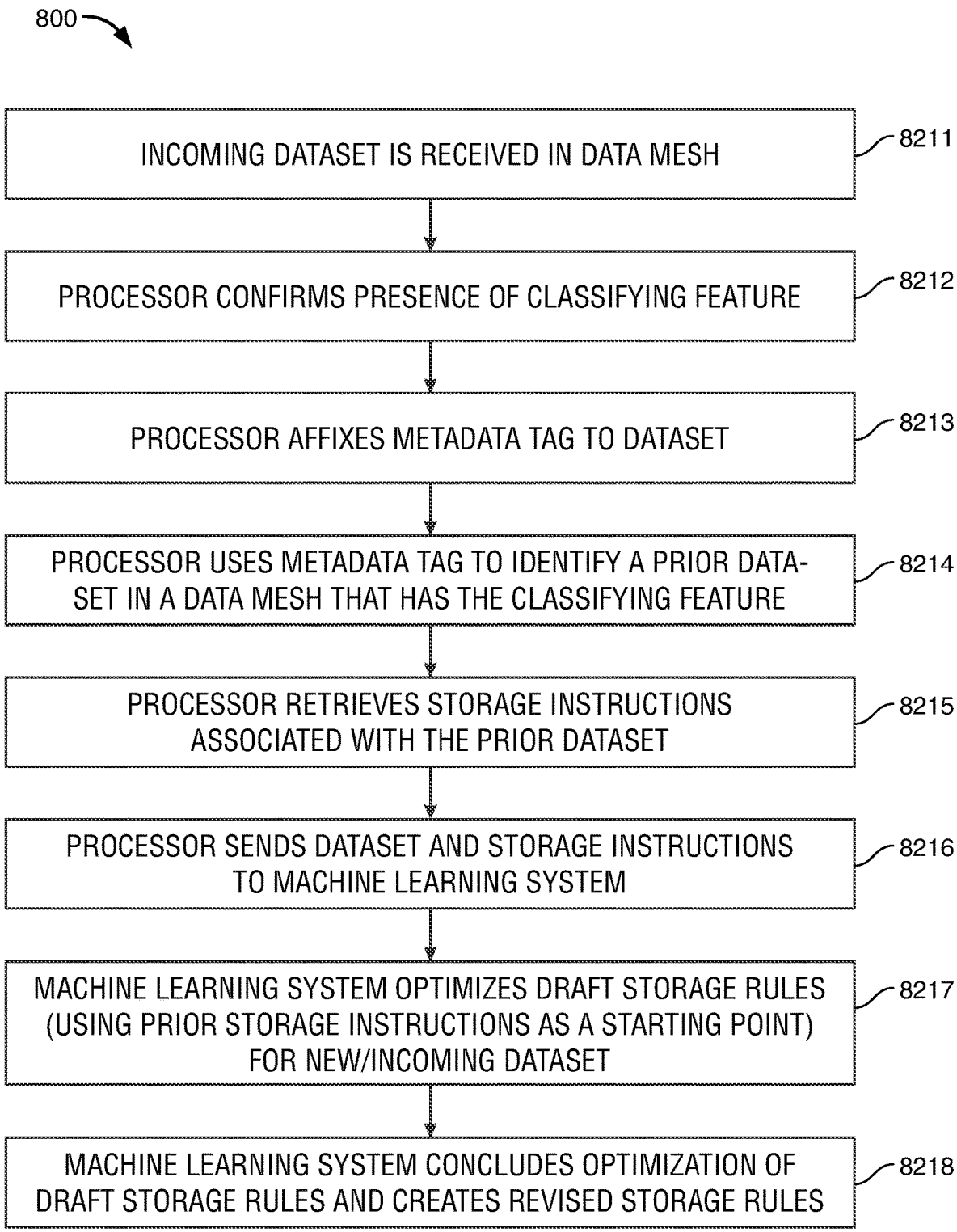
FIG. 8 is a flowchart depicting steps of a method of storing an incoming dataset in a local data mesh in each of multiple jurisdictions, in accordance with principles of the disclosure.

FIG. 8 is a flowchart depicting steps of a method 800 of storing an incoming dataset in a local data mesh in each of multiple jurisdictions, in accordance with principles of the disclosure. (In a preceding step, not depicted here but depicted, e.g., in FIG. 3, a metadata tag is saved in association with a classifying feature and storage instruction, in a first relational database).

In step 8211, an incoming dataset received in the data mesh.

In step 8212, the presence of the classifying feature is confirmed. In various embodiments, this may be done manually, or by an automated procedure, e.g., by a processor.

In step 8213, a processor (e.g., a processor associated with the data mesh) affixes the metadata tag to the dataset.

In step 8214 a processor uses metadata tag to identify a prior dataset in data mesh that has the classifying feature.

In step 8215, a processor retrieves storage instructions associated with the prior dataset.

In step 8216, a processor sends the dataset and storage instructions to a machine learning system or engine, which may be, in some embodiments, a tunable storage rule engine.

In step 8217, the machine learning system or engine uses the prior storage instructions as a starting point for the new (incoming) dataset and optimizes the draft storage rules for the new dataset.

In step 8218, the machine learning system or engine concludes optimization of the draft storage rules and creates optimized storage rules for the new dataset.

In subsequent steps (not depicted in FIG. 8, but depicted in other figures and herein), the metadata tag may be automatically associated with the initial storage location of the database, in a second relational database. In subsequent steps (not depicted in FIG. 8, but depicted in other figures and herein), the storage instruction saved in association with the classifying feature in the first relational database may be modified, referred to as the modified storage instruction. In subsequent steps (not depicted in FIG. 8, but depicted in other figures and herein), the machine learning system or engine may use the modified storage instruction as a starting point for storing the dataset and then optimize the draft (modified) storage rules for the dataset.

In certain embodiments, all the aforementioned components communicate via a network. In some embodiments, all the steps of the above methods are performed by a processor.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with intelligently controlling data transfers between network connected devices and a platform layer application server.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for intelligently controlling data transfers between network connected devices and a platform layer application server, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

In some aspects of the described methods and systems, a regulated machine learning (ML) model is utilized. The regulated ML model is designed to make incremental learning adjustments in tandem with the determinations made by the machine learning engine and communicated to the regulated ML model. The machine learning engine accesses data outputted from storage of previous datasets, and it is trained to use data from the incoming dataset to collectively formulate and approve incremental learning adjustments with the regulated ML model. The regulated ML model and the machine learning engine may consider input data patterns, output data patterns, thresholds for model performance, and/or distributions of identified patterns between different ML models.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods, systems, apparatuses, and computer program products for self-organization of data storage are provided. Persons skilled in the art will appreciate that the present invention can be practiced by other than the described embodiments, which are presented for purposes of illustration rather than of limitation.

What is claimed is:

1. A method of tuning data storage within a data mesh based on machine learning outputs, said method using a processor, said method comprising the steps of:
    associating in a first relational database, a metadata tag with:
        a classifying feature; and
        a first storage instruction;
    identifying an initial storage location for an incoming dataset within the data mesh, the identifying being tunable using a machine learning system, the machine learning system executing on the processor, the tunability comprising:
        upon receipt of said incoming dataset by said data mesh, ascertaining whether said incoming dataset comprises said classifying feature;
        upon confirmation that the incoming dataset comprises said classifying feature, using the processor to:
            obtain said metadata tag and said first storage instruction from said first relational database;
            annotate said incoming dataset with said metadata tag, thereby generating a tagged dataset;
            store said tagged dataset in the initial storage location, according to said first storage instruction; and
            associate, in a second relational database, said metadata tag with said initial storage location;
    subsequently modifying the first storage instruction using the machine learning system, the modifying comprising using the machine learning system to:
        identify a previously stored dataset that is possibly a closest match to the incoming dataset;
        determine a degree of match between the previously stored dataset and the incoming dataset based on a set of predetermined parameters;
        derive storage rules from a storage instruction corresponding to the previously stored dataset in response to determining that the degree of match is the closest match; and
        generate a modified storage instruction using the storage rules, the modified storage instruction comprising an instruction to store the incoming dataset in a second storage location that differs from the initial storage location;
    connecting the initial storage location to the second storage location via a data link, the data link comprising a transmitter, a receiver and a data telecommunication circuit, the data link being governed by a link protocol; and
    upon generation of said modified storage instruction, transferring, via the data link, said incoming dataset from the initial storage location to the second storage location.

2. The method of claim 1, further comprising the step of automatically associating, in said second relational database, said metadata tag with said second storage location.

3. The method of claim 1, wherein said initial storage location and said second storage location have different requirements for data storage.

4. The method of claim 1, wherein said modified storage instruction reflects constraints of said second storage location that do not exist for said initial storage location.

5. The method of claim 1, wherein said modified storage instruction reflects said second storage location not being subject to constraints that exist for said initial storage location.

6. The method of claim 5, wherein said constraints comprise a limited storage lifespan for at least some data fields in said initial storage location.

7. The method of claim 6, wherein said modified storage instruction is automatically triggered by an indication of said limited storage lifespan.

8. The method of claim 1, wherein said modified storage instruction comprises denying user accessibility of at least one data field in said second storage location, wherein said at least one data field is accessible in said initial storage location.

9. The method of claim 1, wherein said modified storage instruction comprises making accessible at least one data field in said second storage location, wherein said at least one data field is not accessible in said initial storage location.

10. The method of claim 1, said method further comprising the step of automatically gatekeeping data transfers along said data link.

11. The method of claim 1, wherein the steps of
(i) subsequently modifying said storage instruction; and
(ii) automatically further storing said incoming dataset;
are repeated a plurality of times.

12. The method of claim 1, wherein said incoming dataset originated in a first jurisdiction, wherein said initial storage location is housed in said first jurisdiction; and wherein receipt of said incoming dataset in a (sub) network housed in a second jurisdiction automatically triggers said step of subsequently modifying said storage instruction.

13. The method of claim 12, wherein said second storage location is housed in said second jurisdiction.

14. The method of claim 1, wherein said storage instruction is derived from a storage instruction associated with a prior dataset annotated with said metadata tag.

15. The method of claim 14, wherein said storage instruction is produced by a tunable storage rule engine.

16. The method of claim 1, wherein said metadata tag is in binary format.

17. The method of claim 1, said method further comprising the step of identifying redundant copies of said incoming dataset in said data mesh.

18. The method of claim 17, said method further comprising the step of deleting said redundant copies of said incoming dataset.

* * * * *